United States Patent [19]

Williamson et al.

[11] 4,053,320
[45] Oct. 11, 1977

[54] PRODUCTION OF REFRACTORY ARTICLES

[75] Inventors: John Peter Hugh Williamson, Chester; Harry Augustus Morriss, Wolverhampton, both of England

[73] Assignee: Keeling & Walker Limited, Stoke-on-Trent, England

[21] Appl. No.: 692,822

[22] Filed: June 4, 1976

[30] Foreign Application Priority Data

June 10, 1975 United Kingdom ............... 24813/75

[51] Int. Cl.² ............................................. C04B 35/48
[52] U.S. Cl. .................................................... 106/57
[58] Field of Search .......................................... 106/57

[56] References Cited

U.S. PATENT DOCUMENTS

| 2,553,265 | 5/1951 | Mochel | 106/57 |
| 3,804,649 | 4/1974 | Manigault | 106/57 |
| 3,899,341 | 8/1975 | Schwarz | 106/57 |

*Primary Examiner*—J. Poer
*Attorney, Agent, or Firm*—William Anthony Drucker

[57] ABSTRACT

The process for the production of a refractory body comprises comminuting plasma dissociated zircon sand, mixing the comminuted sand with a functional additive for the purpose of reducing the subsequent firing temperature, moulding the resulting mixture to form a body, and finally firing the moulded body until sintering occurs.

18 Claims, 5 Drawing Figures

PRODUCTION OF REFRACTORY ARTICLES

BACKGROUND TO THE INVENTION

The present invention relates to the production of refractory materials satisfactory in performance up to temperatures of 1650° C, particularly but not solely in steel melting processes.

Reviews of existing techniques and of developments now underway have been extensively described in the literature for instance by P. Artelt (Trans. Brit. Ceram. Soc. 74 (3) 67, 1975) "Refractories for oxygen steel-making in Germany"; by G. M. Farmery (Steel Times Annual Review, 89, 1968, L17524) "Trends in the Technology of Casting Pit Refractories in the U.K."; and by D. H. Houseman (Steel Times Annual Review 1971) "High Alumina: steelmaking refractory of the future". Present materials now used for these purposes include mullite, alumina chrome magnesite, zircon, and zirconium oxide. Combinations of two or more of these substances are also employed.

These refractory must have a reasonable resistance to thermal shock, that is, they must withstand the temperature cycles common in the steel making process (typically 110° C to 1750° C and sometimes then down to ambient temperatures). It is highly desirable that the refractory can undergo an appreciable number of working cycles — a minimum of 30 being regarded as satisfactory. Statements of some of the more important features of the thermal properties of refractories have been made by e.g. D. P. H. Hasselmann (J. Amer. Ceram. Soc. 57 (10) 1974); by Ainsworth and Herron (Bull. Amer. Ceram. Soc. 153 (7) 1974) and by V. Dauknys, et al ("Science of Ceramics", Vol. 7 1973).

Other properties which have been said to be important include:
 i. chemical resistance (with respect to the steel and to the alloying constituents)
 ii. resistance to creep as defined for instance by the B.S. "Creep under load" test and "not modulus of rupture" test (B.S. 1902 Part IA: 1966)
 iii. reasonable mechanical strength (as defined for instance by the "Cold rupture" test).

Studies of these properties with particular reference to bonded zircon refractories demonstrating also the high thermal stability associated with good resistance to acid slag and alkalis have been set out by P. C. Budnikoff (Domez, 5 (1), 47–48 (1933)); G. F. Comstock (J. Amer. Ceram. Soc. 16, 12, 1933) and T. S. Busby et al (Glass Techn., 3, No. 6, 190 1962).

SUMMARY OF THE INVENTION

According to the present invention we provide a process for the production of a refractory body comprising comminuting plasma-dissociated zircon sand, shaping the resulting comminuted sand and firing to form a body of single mass.

The ceramic bodies made from comminuted plasma-dissociated zircon (hereinafter called "Dizirc") differ from those made from comminuted normal zircon sand (e.g. "Zircosil" or "Superzon") in the following characteristics:

1. They may be sintered to higher density by firing under relatively mild conditions. Trials have shown that the higher activity of comminuted plasma dissociated zircon results in a lowering of firing temperatures for a given firing shrinkage of approximately 150° C.
2. Ceramic bodies made from comminuted plasma dissociated zircon is in consequence of their high density less permeable than one made from milled zircon.
3. "Dizirc" bodies are less readily attacked by molten steel-making slags than bodies made from milled zircon by reason of its lower permeability and higher density.
4. The resistance to thermal shock of a "Dizirc" body is better than that of a milled zircon body.

By "plasma dissociated" we mean treatment by a plasma generator, a device for heating gases or solids with an electric arc. It has been observed by Charles et al (Mining & Metall. Trans. 79C 54–59 1970) that Zircon if so heated sufficiently dissociates into a zirconia rich phase and a silica rich phase. It is a characteristic of the equipment now being utilised (and described in British patent specification No. 1,248,595 — Ionarc Smelters Limited) that the method produces a zirconia rich phase containing substantially less than 0.5% silica and a silica rich phase correspondingly low in zirconia. This very efficient separation is thought to result from the combination of ultra-high temperature and rapid quench to which the zircon particles are subjected in the arc. A furnace of Ionarc design operates at 300–400 kW and has a throughput of 300–600 lbs/hour.

The processed product has a somewhat lower melting point and lower specific gravity (3.5 to 4.0) than normal zircon and consists essentially of intimate mixtures of zirconia in the form of radially oriented crystal aggregates (shown diagrammatically as "A" in FIG. 1) in a matrix of amorphous silica (shown as "B" in FIG. 1). Optical examination of the dissociated product shows that three main categories of material are present: Type I, the relatively unreacted grains of zircon; Type II, angular grains of partially dissociated material; Type III, fully fused, fully dissociated particles usually spherical in form.

DESCRIPTION OF PREFERRED EMBODIMENT

Figure 1:
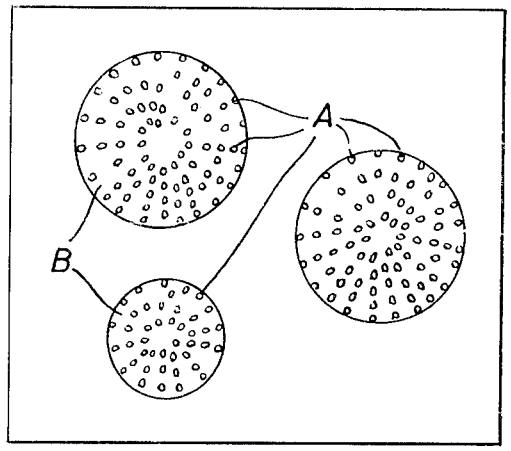
FIG. 1 represents diagrammatically the fine structure of a fully fused dissociated zircon spheroid. The zirconia microlites or aggregates are on average only 0.1–0.2 microns in cross-section, although the aggregate as a whole may be many microns long, whilst the spheroids themselves will vary from 50 microns to 250 microns in diameter.
Figure 2:
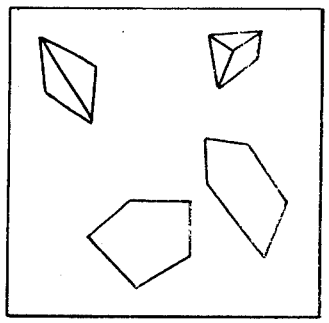
FIG. 2 is a microscopic representation of the typical unreacted grains of zircon (Type I)
Figure 3:
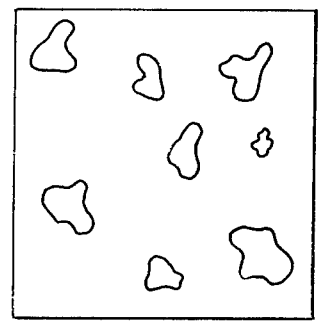
FIG. 3 shows partially dissociated zircon grains (Type II). Note that Types I and II are not normally readily distinguishable by the outline shape of the particles — a more convenient means of distinguishing the two is the colouration characteristic of Type II which is due to the crystalline zirconia within the Type II grains using an optical microscope with plane polarised light.
Figure 4:
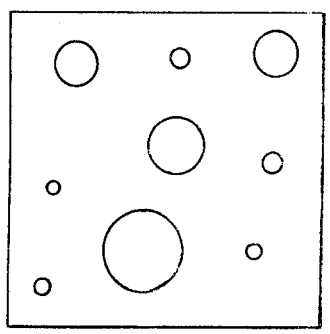
FIG. 4 shows fully fused, fully dissociated grains (Type III). These grains are generally hollow to some extent and the silica proportion is, in addition, very highly microporous; the average specific gravity of the grain itself is commonly 3.5.
Figure 5:
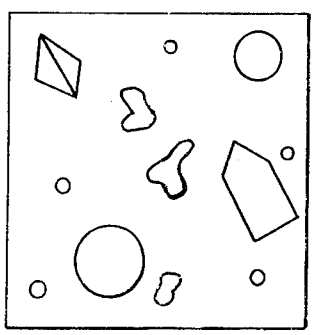
FIG. 5 represents the appearance of the product from the torch itself.

The proportions of the particles of the Type I, II and III are dependent upon the rate of throughput of the zircon sand through the art and upon the power applied. If the throughput is sufficiently slow, then the dissociated zircon will be predominently of Type III. At relatively faster throughputs the dissociated zircon produced will include more appreciable proportions of Type I and Type II varieties. AS a general rule, representatives of all three types will be found in any dissociated zircon. For the purposes of the present invention the dissociated zircon should contain at least 90% preferably at least 96% of the Type III material. The plasma dissociated zircon sand used in the following examples has an average specific gravity of between 3.5 and 4.0 and comprises 80% by weight dissociated grains preferably 50% to 98% fully fused particles of dissociated zircon, 2% to 35% weight partially dissociated particles, and up to 15% weight undissociated grains. Since the sintering reaction results in the formation of zircon, it is possible to produce bodies with certain of the required properties — but not the low porosity characteristic of a fully dissociated "Dizirc" ceramic — from DZ materials less thoroughly dissociated.

In order to produce sintered ceramic bodies with good mechanical strength the plasma dissociated zircon (DZ) must be comminuted. In some of the examples which follow the comminuted plasma dissociated zircon is referred to as "Dizirc" which is the Registered Trade Mark of Keeling & Walker Limited (No. 1027872). Either dry or wet milling methods may be used, although the most advantageous processes devised involve a wet milling in the presence of additives which attach the silica constituent in the DZ; such additives include Caustic soda, caustic potash, hydrofluoric acid, alkali metal or ammonium bifluorides, alkali metal or ammonium fluoride in the presence of hydrofluoric acid, and alkaline sodium silicates. Concentrations of additive up to 10% effective agent relative to the DZ may be used although the optimum is usually 1–3%. The amount of water which may be added is between 5% and 25% but best results will normally be obtained between 15% and 20%.

The following Examples I and II describe methods of dry milling in the laboratory:

EXAMPLE I

6 Kilos of ½ inch cylinder zircon grinding media are charged to a 1 gallon porcelain ball mill and 1 kilo of dissociated zircon is added; the comminuted material is extracted from the mill after several hours or when 98% passes through a 200 (BS) mesh.

Advantage may be taken from the fact that "Dizirc" fractions of different particle sizes may have different properties when incorporated into the refractory composition.

EXAMPLE II 6 kilos of ½ inch cylinder grinding media are charged to a 1 gallon porcelain ball mill and 1 kilo of DZ added. After dry milling for several hours until 98% is less than 150 mesh (BS) the extracted material is separated first through a 150 mesh sieve and then through a 325–350 mesh sieve to give two Dizirc fractions.

Wet milling procedures may be carried out on a pilot plant scale as illustrated in the following Examples III and IV.

EXAMPLE III 900 pounds of 1½–2 inches high density alumina balls are charged to 3 feet 6 inches ball mill with 450 pounds of DZ, 9 pounds of caustic soda flake, and 75 pounds of water. After milling for 20–30 hours or until 98–99% is less than 200 mesh (BS), the charge is neutralised with hydrochloric acid (27 lbs) or sulphuric acid. The slurry is dumped from the mill, spray dried or dried by any other convenient means, and the particle size of the powder product determined (it will usually be 3–6 microns on the Fisher Sub-Sieve Sizer).

EXAMPLE IV

This alternative method would use with 450 pounds of DZ, 1% of sodium fluoride (4½ lbs) and ½% hydrofluoric acid (4lbs of 60% H.F. acid). After milling for 15–30 hours or until 98–99% is less than 200 mesh, the charge is neutralised with caustic soda. The slurry is then dumped and dried. Alternatively, the charge is neutralised after dumping but before drying. It is further feasible and occasionally advantageous to neutralise the charge at any time during the course of the milling process. This neutralisation process, the "finish" may be omitted at discretion.

It is possible and sometimes desirable also to wash out all water soluble materials before the drying process — but in the case of the "fluoride attack" (Example IV above) some loss of zirconium values will result.

It will be convenient to combine the other constituents of the refractory with the DZ during all or part of the milling process or to do so after milling. Examples of constituents which may be so combined include:

| Functional oxide additives | e.g. iron oxide (or hydroxide) lime magnesia yttria alumina mullite |
|---|---|
| Wax emulsions | e.g. "Mobilcer" |
| Water soluble polymeric binders | e.g. polyvinyl alcohol or polyethylene glycol |
| Standard high temperature binders | e.g. clays or frits | zirconium oxide preferably but not exclusively the oxide derived from caustic leached dissociated zircon.

In general, all the constituents whether fugitive, such as pressing aids, deflocculants, green strength additives or fillers, or functional such as oxides, clays or frits commonly used in conventional practice and which may have some effect on the properties of the final fired body may be incorporated with this process usually but not invariably after the neutralisation step. The quantities of these additives may be selected in accordance with those usual in known refractory material manufacturing processes. A description of the types of oxide additives which may be used and the properties to be expected when sintered with zircon or zirconia is given by E. P. Hyatt et al (American Ceramic Society vol.36, No. 8 1957). Whilst the predicted properties of density and porosity are developed by a "Dizirc" composition using these oxide additives, we have found that contrary to expectations the sintering temperature with the use of "Dizirc" is 200°–250° C less than the sintering temperature of normal zirconia and zircon compositions. This reduction in reaction temperature is clearly of considerable commercial importance at these elevated temperature levels.

In the following Example V the form of DIZIRC used was prepared by the method set out in Example IV that from the "caustic attack" being referred to as DIZIRC "C" and from the "fluoride attack" DIZIRC "F".

EXAMPLE V 200 gm. samples of DIZIRC "C" and DIZIRC "F" were mixed with 3% by weight of "Carbowax 4000" and pressed at a pressure of 10 tons per square inch. The pressed pieces were heated in a kiln fired with natural gas in a slightly oxidising atmosphere (1% excess oxygen) for one hour at a temperature of 1600° C. The fired bodies developed considerable mechanical strength and sustained only very superficial cracking upon reheating to 1400° C and quenching in cold water. Typical densities of the fired bodies are:

| | |
|---|---|
| DIZIRC "C" | 3.09 gm/cc |
| DIZIRC "F" | 3.1 gm/cc |

Some variations in these densities can be expected with different sintering temperatures.

Compositions containing such added oxides as referred to in Hyatt et al (see above) will develop their properties at temperatures less than 1600° C, commonly 1300° C–1350° C.

The above Example V illustrates the method of manufacture by dry pressing. Other conventional preparation methods for shaping the material can also be used including inter alia electrostatic deposition isostatic pressing, and slip casting. It is also possible, and sometimes advantageous, for the mixed materials to be pre-sintered to give densified granules which can be sized and fabricated in any conventional manner.

The compositions are suitable for making bodies of any desired thickness or shape for various applications in a wide variety of industrial uses.

We claim:

1. A process for the production of a refractory body comprising comminuting plasma dissociated zircon sand, shaping the resulting comminuted sand and firing to form a body of single mass.

2. A process according to claim 1, wherein the following comminution of the plasma dissociated zircon sand a functional additive is mixed therewith prior to shaping.

3. A process according to claim 1, wherein the plasma dissociated zircon sand is first mixed with a functional additive and the mixture ground to reduce the particle size of the zircon sand.

4. A process according to claim 1, wherein prior to shaping a functional additive is added comprising at least one of the group consisting of iron oxide, iron hydroxide, lime, magnesia, yttria, alumina and mullite.

5. A process according to claim 4, wherein other constituents are present in the form of binders.

6. A process according to claim 5, wherein the binders comprise at least one of the group consisting of wax emulsions, water soluble polymeric binders, clays and frits.

7. A process according to claim 1, wherein the plasma dissociated sand is comminuted to a particle size of between 200 and 350 mesh (British Standard).

8. A process according to claim 1, wherein the plasma dissociated sand is comminuted to a particle size of less than 350 mesh (British Standard).

9. A process according to claim 1, wherein the comminution of the plasma dissociated zircon sand is effected under dry conditions in a ball mill.

10. A process according to claim 1, wherein the comminution of the plasma-dissociated zircon sand takes place under wet conditions in a ball mill.

11. A process according to claim 10, wherein the wet milling is carried out in the presence of an additive which reacts with the silica constituent of the dissociated zircon.

12. A process according to claim 11 wherein the additive is selected from the group consisting of caustic soda, caustic potash, sodium silicate potassium silicate, hydrofluoric acid, sodium bifluoride, potassium bifluoride, ammonium bifluoride, ammonium fluoride and an alkali metal fluoride in the presence of hydrofluoric acid.

13. A process according to claim 11, wherein the additive is neutralised after milling.

14. A process according to claim 1, wherein the plasma dissociated zircon sand when comminuted has an average specific gravity of between 3.5 and 4.0.

15. A process according to claim 1, wherein the plasma dissociated sand contains up to 80% weight dissociated grains.

16. A process according to claim 15, wherein the plasma dissociated zircon sand consists of 50% to 98% weight fully fused particles of dissociated zircon, 2% to 35% weight partially dissociated particles and 0 to 15% weight undissociated grains.

17. A process according to claim 11 wherein the resulting slurry contains soluble constituents which are removed by washing.

18. A process according to claim 11, wherein the resulting slurry is dried.

* * * * *